July 14, 1931. B. E. FORD 1,814,680
EGG TREATING MACHINE
Filed Nov. 14, 1927 8 Sheets-Sheet 3

Inventor
Burdette E. Ford
By Luther Johns, atty.

July 14, 1931. B. E. FORD 1,814,680
EGG TREATING MACHINE
Filed Nov. 14, 1927 8 Sheets-Sheet 8

Patented July 14, 1931

1,814,680

UNITED STATES PATENT OFFICE

BURDETTE E. FORD, OF CHICAGO, ILLINOIS, ASSIGNOR TO THE STEROLENE COMPANY, OF CHICAGO, ILLINOIS, A CORPORATION OF ILLINOIS

EGG TREATING MACHINE

Application filed November 14, 1927. Serial No. 232,987.

These improvements relate to egg treating machines, with more particular reference to means and facilities for handling the eggs preliminarily and subsequent to their actual treatment. The main object is to render more expeditious and to save labor in these egg-handling operations. Other objects and advantages will appear hereinafter in connection with the particular description of the device.

In the accompanying drawings forming a part hereof

Fig. 15 is a sectional view at about the line 15—15 of Fig. 18;

The main frame of the machine is made chiefly of angle iron and sheet metal. It extends on both sides of the central dipping unit marked as a whole 30, Figs. 1 and 2. It is broadly old to provide a tank 31, Figs. 2 and 19, and a platform as 32 (Figs. 19 and 20) reciprocated up and down in the heated oil of the tank for immersing for a brief interval a container or rack having say three dozens of eggs, all for the purpose of treating the eggs to maintain them for a considerable length of time against putrefactive changes. The present improvements are not with respect to the method of treatment, but rather with details of construction and arrangement of parts in a machine for the purpose.

Figures 19, 21:
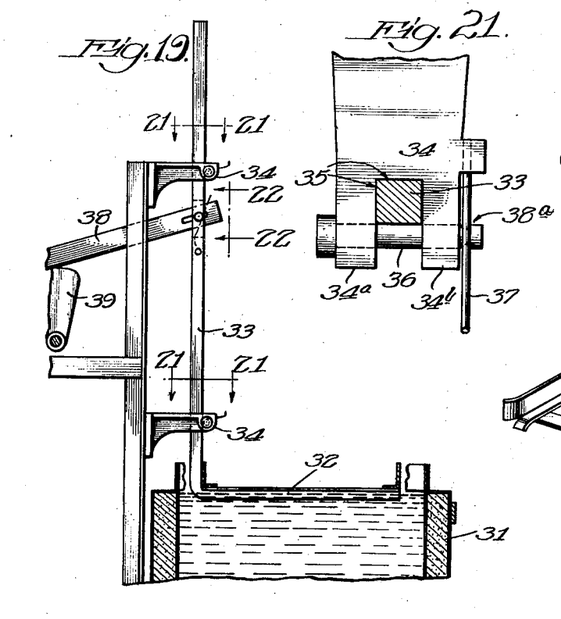
Fig. 19 is a detail at the middle portion of the machine where the eggs are dipped, as at the line 19—19 of Fig. 1.
Fig. 21 is an enlarged sectional view as on either line 21—21 of Fig. 19.
Figure 20:
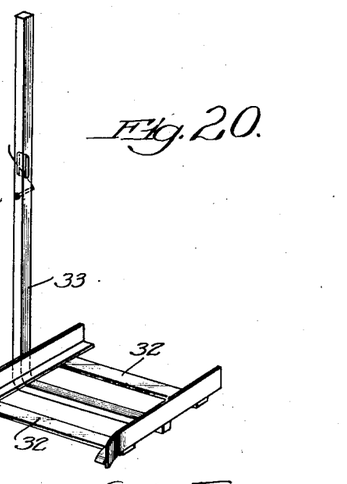
Fig. 20 is a perspective of the reciprocating egg carrier.
Figure 22:
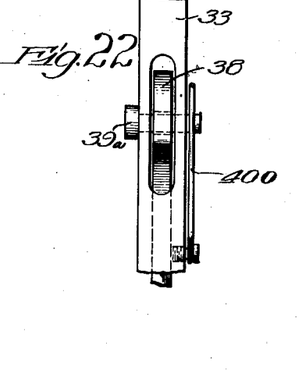
Fig. 22 is an enlarged fragmentary front view as at about the line 22—22 of Fig. 19.

In connection with the reciprocating frame 32 of Fig. 20, I have shown a valuable improvement making for the ready removability of this plunger element. The upright stem 33 is carried by a pair of brackets 34 recessed at 35, Fig. 21, to accommodate the plunger rod 33. A headed pin 36 passing through the extension 34a and 34b is maintained in position by a spring 37 pressing into an annular groove at 38a near the free end of the pin. The vertically moving arm 38, Fig. 19, is periodically lifted by the cam 39. The mounting of the rod 33 with respect to the arm 38 is shown in Fig. 22 where the rod is shown to be slotted to receive the rod 38 while the headed pin 39a held by a spring 400, as already described with respect to the pins 36, maintains the connection. In order to remove the units shown by Fig. 20 it is only necessary to lift the springs 37 and 400, push back the pins 36 and 39a, and then draw these pins out and away, and thereupon this vertical reciprocating egg carrier unit of Fig. 20 may be taken bodily away. This feature is quite important in view of the desirability for cleaning the tank from time to time, and for other purposes, and these means enable the removal and reapplication of this reciprocating unit in an exceedingly brief space of time.

It will aid the understanding of the device as a whole if I describe in general the manner of use with a reference to the parts shown in the drawings.

Figure 1:
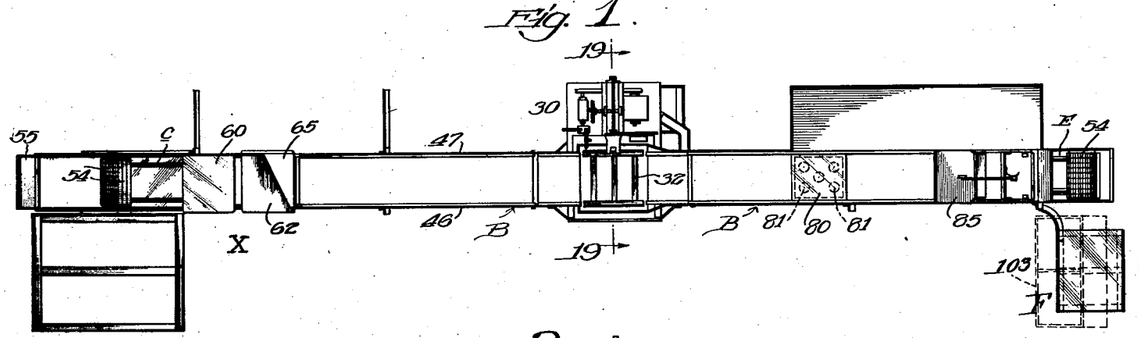
Fig. 1 is a top plan of a machine complete embodying these improvements.
Figure 17:
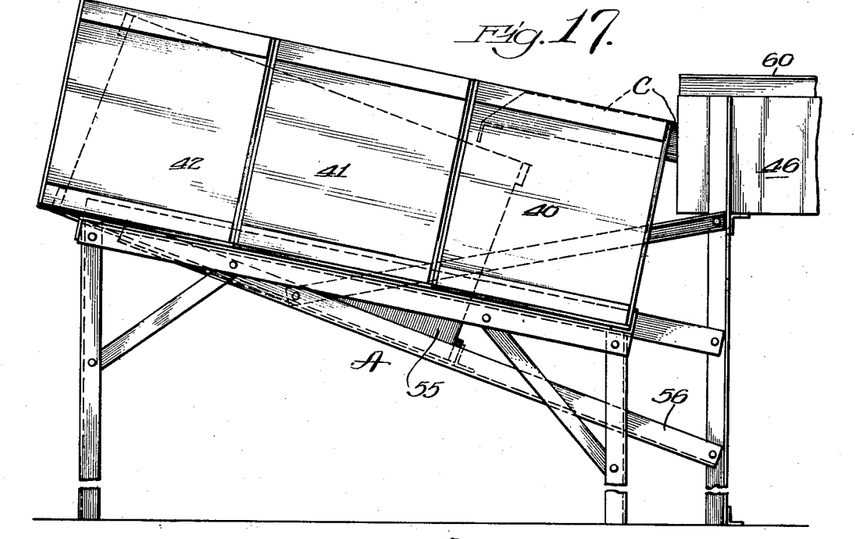
Fig. 17 is a side elevation of the left hand end of the machine including what is omitted from the side view of Fig. 2, namely a frame for holding packing boxes.

One of the operators stands at about the place marked X at the left hand end portion of Fig. 1. On the frame A (Fig. 1) are positioned several, as three, of the usual shipping boxes containing eggs to be treated. Fig. 17 shows these boxes, numbered 40, 41 and 42. When the contents of box 40 have been removed that box is lifted away and the other two boxes, aided by gravitation, are moved downward into the position shown for boxes 40 and 41 respectively, while an attendant supplies another box of eggs at the top. This frame A is shown as being constructed of angle iron. It is thought the particular frame members do not call for detailed description in view of the illustrations of Figs. 1 and 17. Its importance is not so much in its construction as in the arrangement of such a frame as a utility in carrying out the treatment in an easy, convenient and expeditious way.

Figure 2:
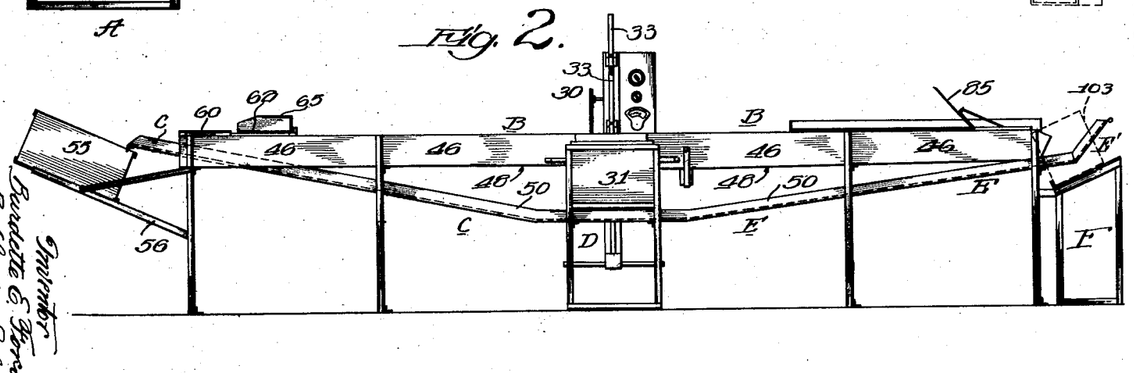
Fig. 2 is a side elevation thereof omitting the crate-holding frame part shown at the left hand end of Fig. 1.
Figures 7, 8, 9, 10, 11:
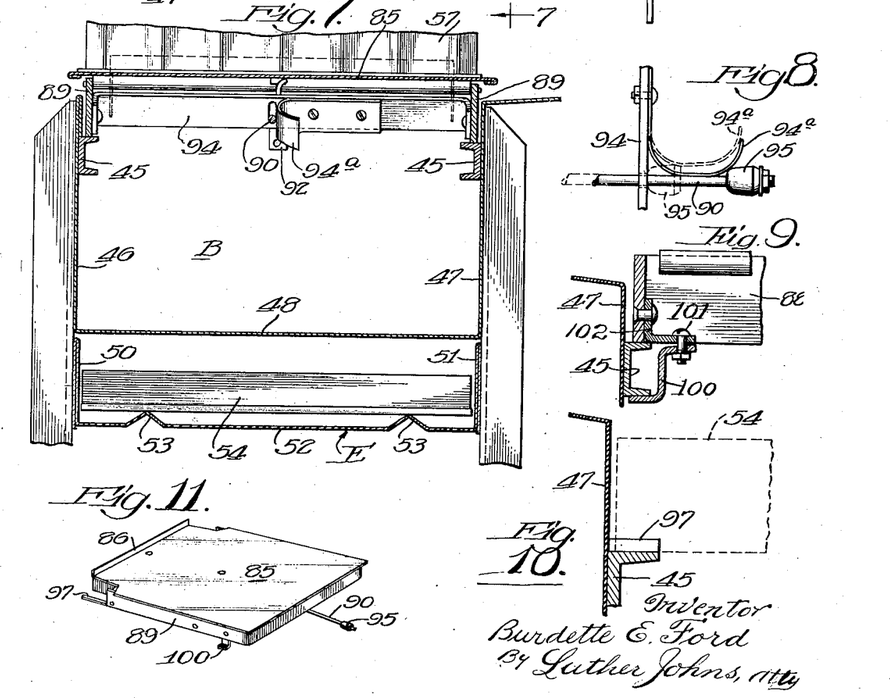
Fig. 7 is a cross-section on about the line 7—7 of Fig. 6.
Figs. 8, 9 and 10 are details of construction.
Fig. 11 is a perspective of a movable tray shown upstanding in Fig. 3.

The longitudinally extending main frame shown in Figs. 1 and 2 and in various other figures is shown sectionally to advantage in Fig. 7. There is a pair of oppositely-disposed channel irons 45 to which are secured a trough-like open top casing having a front side wall 46, a rear side wall 47 and a bottom wall 48 formed in my practice of galvanized iron. This trough-like construction extends from the central part or dipping mecha ism at 31 in the two opposite directions. I will mark each of these upper trough-like formations B.

Figures 3, 4:
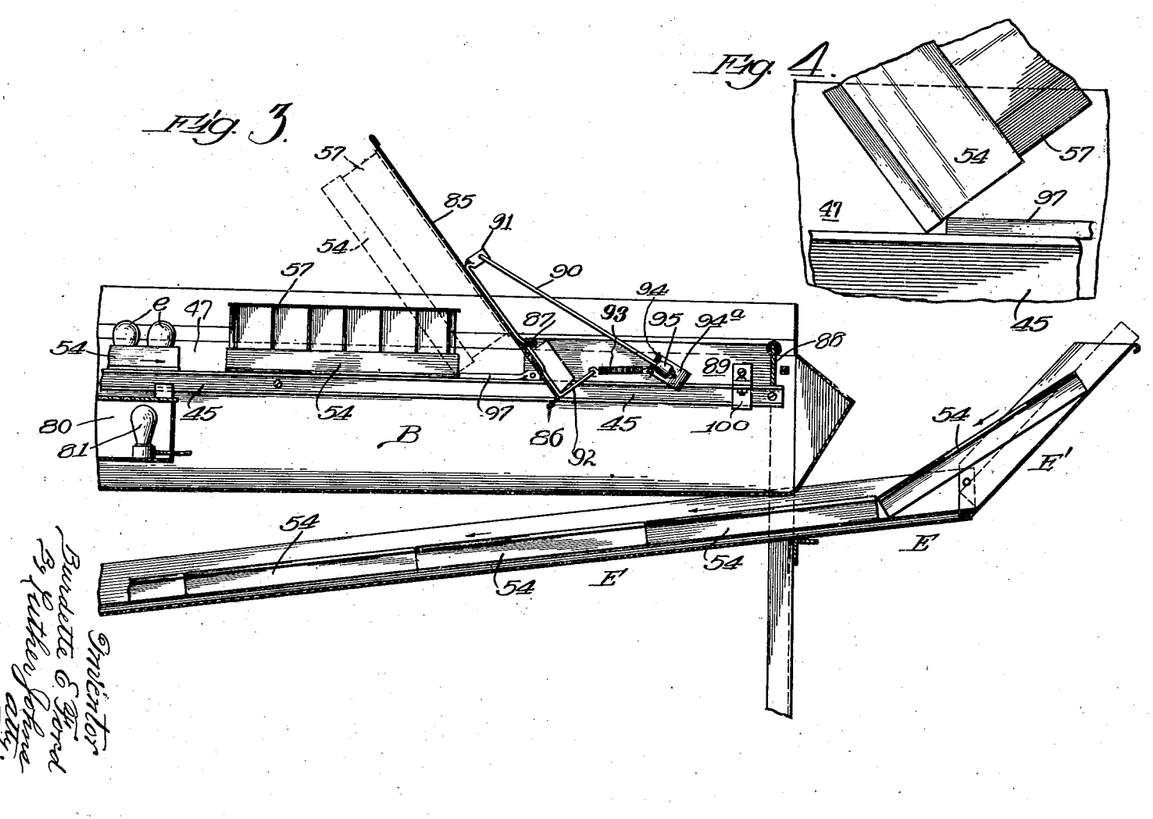
Fig. 3 is an enlarged fragmentary vertical longitudinal sectional view of the unloading end of the machine.
Fig. 4 is an enlarged fragment of a part of Fig. 3.
Figures 12, 13:
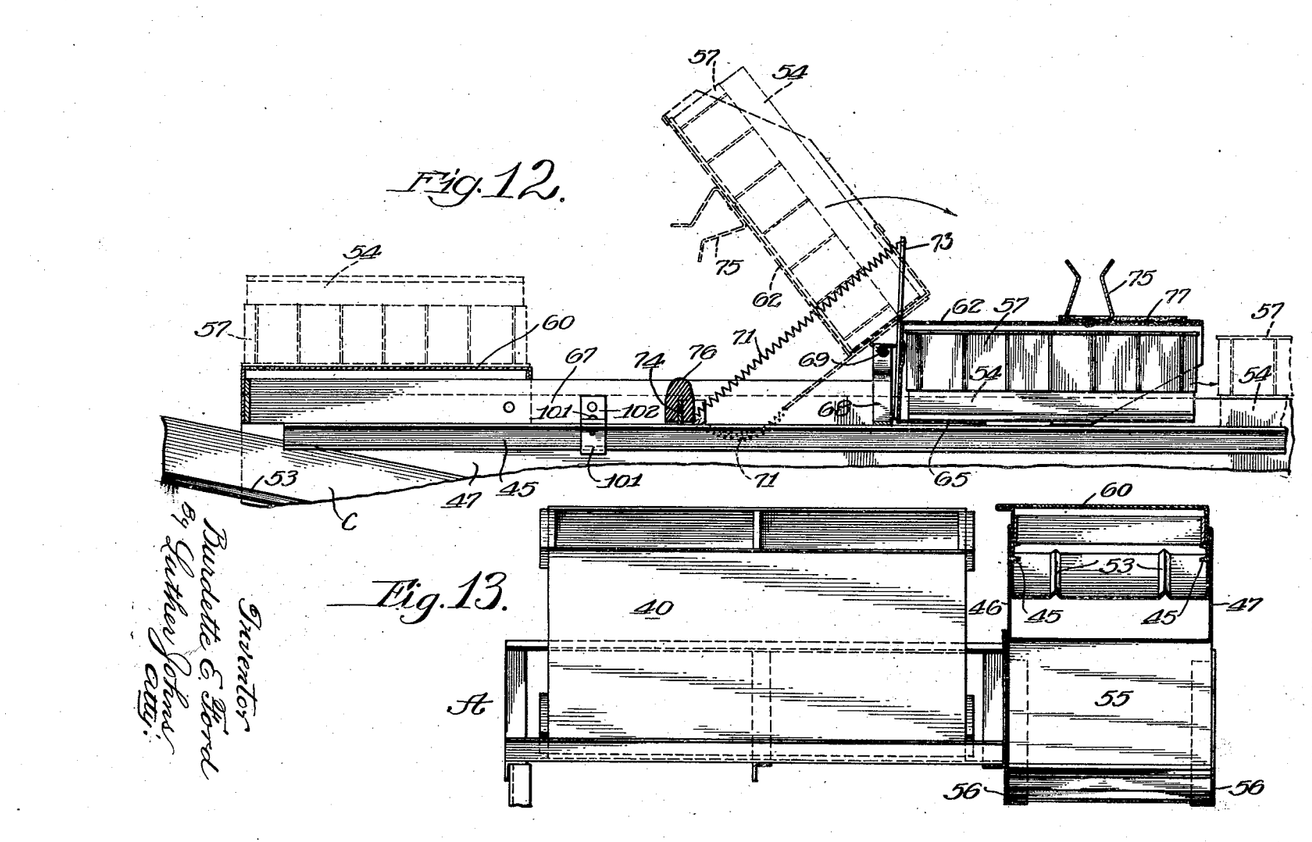
Fig. 12 is a fragmentary vertical longitudinal sectional view at the left hand or loading end of the frame structure.
Fig. 13 is an enlarged fragmentary sectional view of parts shown in Fig. 12, together with additional parts.

Below the trough-like structures B I provide another trough structure having three sections marked in Fig. 2 as C, D and E. Section D is horizontal and passes beneath the tank 31 while sections C and E incline upwardly and away from the horizontal section D. Fig. 7 shows how all of these sections C, D and E are formed, namely with a front side wall 50, a rear side wall 51, and a bottom wall 52. The bottom wall has a pair of upwardly-extending ridges 53 formed therein to permit easy sliding movement therein of the egg racks 54. Figs. 3 and 12 show how egg racks 54 occupy the trough sections C, D and E, one against another. At the right hand end of the machine, as shown by Fig. 3, these racks 54 are inserted, and at the left hand end, as in Fig. 2, they are discharged. The trough sections E, D and C constitute means for sliding these egg racks from the discharge end of the machine to the loading end for another use.

Figure 18:
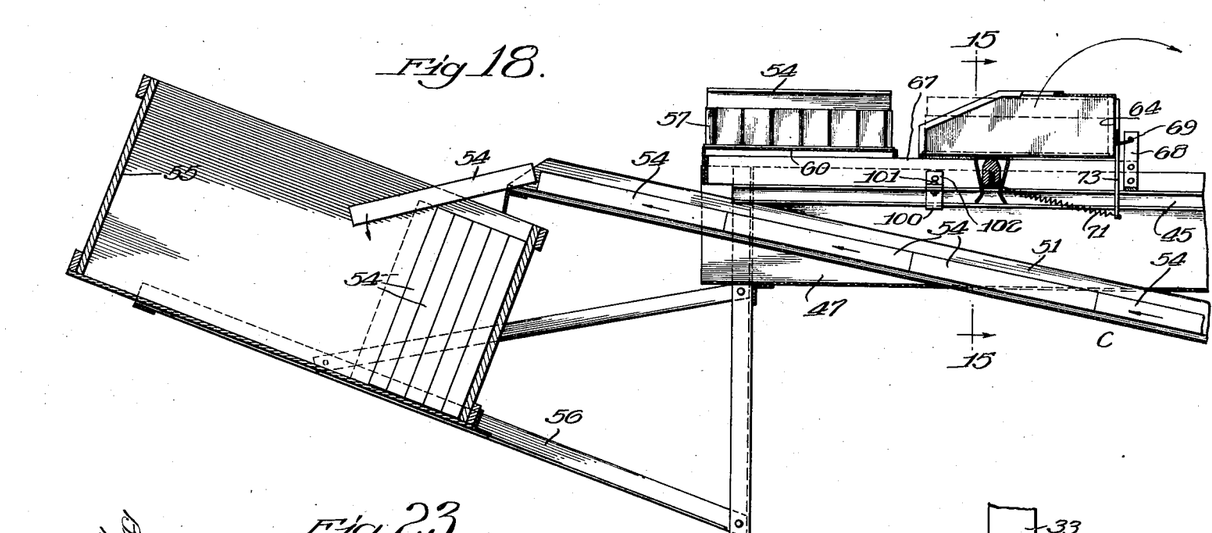
Fig. 18 is a vertical medial section at the left hand end of the machine showing a packing box on a frame in line with the main frame.

Fig. 18 shows how these racks 54 are discharged into a box 55 resting on an upwardly inclined frame part 56 carried by the main frame. The operator picks the racks 54 out of the box 55 as rapidly as he needs them, and since the racks are constantly being inserted at the other end of the rack trough there is thus a constant supply available. The operator at the right hand or discharge end on placing another rack 54 in the trough section E gives the whole line of racks a push, and thereupon one or several of them spill into the box 55 at the other end. These racks 54 are of light-weight metal, as tin, and very little effort is required to convey them in the manner described from one end of the machine to the other.

Figure 23:
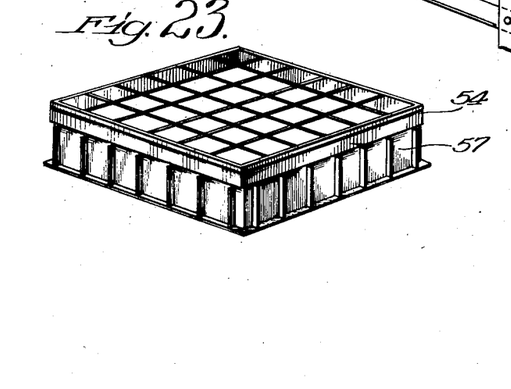
Fig. 23 is a perspective of one of the cardboard egg packing units ordinarily called fillers having thereon one of the metallic egg racks.

Fig. 23 shows one of the racks 54 superimposed upon a filler 57. These fillers are made of cardboard and are ordinarily divided into 36 compartments. The metal rack 54 similarly has 36 compartments registering with those of the filler. The eggs arriving for treatment in such crates as 40, 41 and 42 of Fig. 17 are contained in fillers 57. The object of the operator standing at X Fig. 1 is to remove the egg-holding fillers 57, one at a time, from the packing crate, transfer the eggs to the metal rack 54 and then move the filled metal rack along toward the dipping tank.

Figures 13, 14, 16:
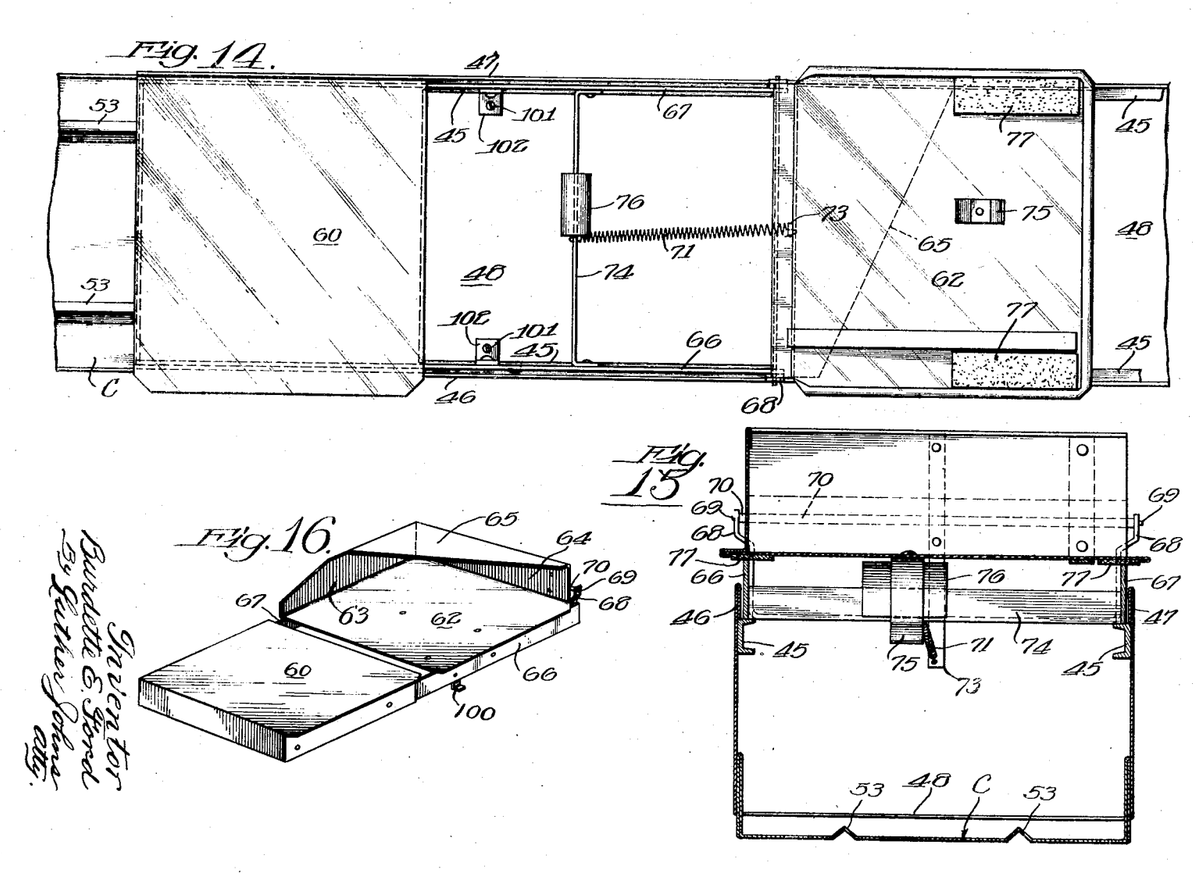
Fig. 14 is a top view of the left hand end of the machine.
Fig. 16 is a perspective of an associated tray and swinging member shown in Fig. 14.

Fig. 14 shows in top view a platform 60 on which the operator rests a filler containing eggs lifted bodily from the packing crate resting on frame A. Fig. 12 shows by dotted lines a filler 57 resting on the platform 60, and on top of the filler 57 one of the racks 54, the latter having been picked out of the box 55 and applied to the filler. This platform 60 is a shallow box-like device having side and end walls, and, as shown by Fig. 13, rests on the channel iron frame members 45 and between the upper extensions of the front and rear side walls 46 and 47. It may be moved along bodily to such various relative positions as best suits the operator.

Associated with the platform 60 is another platform 62 (Fig. 16) having an upstanding rear wall 63, an upstanding forward wall 64 and a cover 65 for a corner portion, forming a pocket of limited extent. Supporting the platform 62 is a frame having a shallow front member 66, a corresponding rear member 67 (Fig. 12) and it may have end walls for strength if desired. Secured to the side walls 66 and 67 are upstanding ears 68, Fig. 15, in which are pivotally mounted the ends 69 of the rod 70 secured to the forward wall 64, Fig. 16, of the platform device 62. The plate marked 62 in Fig. 16 and its associated upstanding walls is free to swing upward on the pivotal connections at 69. Fig. 12 shows by dotted lines one stage of this swinging movement and by full lines the completed movement, showing that the filler 57 is now at the top while the rack 54 is at the bottom. On moving to the right the crate and filler and releasing the swinging platform 62 the platform is drawn back to initial horizontal position, as shown by Figs. 16 and 1, by a coil spring 71, Fig. 12, carried by a rod 73 secured upon the rear wall 64 of the swinging member, the other end of the spring 71 being secured to a cross bar 74, Fig. 14, between the front and rear walls 66 and 67 of the frame carrying the swinging platform 62.

Fig. 12 shows a somewhat U-shaped spring clip 75 mounted on the back of the platform 62, and on the cross bar 74 there is a rubber cushion 76, the parts being so arranged that the spring 75 will engage in a clamping way the cushion 76 on the rebound when the swinging platform 62 is released. The operator simply lets this swinging member fly back after he has used it to invert a filler of eggs, and unless some special cushioning means were provided the platform would bounce up and down objectionably on reaching its initial position. Additional cushions 77, Figs. 12 and 14, serve to give the platform a firm seat in initial position and to absorb some of the shock of the back swing.

Again referring to the operation, the filler 57 containing eggs covered by a rack 54 is resting on the platform 60, Fig. 12. The platform 62 is closely adjacent, as shown by Fig. 16. The entire unit of eggs, filler and rack is slid over upon platform 62 and under the partial cover 65. The eggs cannot pass through the meshes of the rack 54 when the unit is swung around. The operator holds the unit with the right hand while he swings the platform 62 over with the left. The rack 54 then comes upon the top surfaces of the channel irons 45, and the unit is pushed forward slightly, to free it from the top wall 65 shown in Fig. 16. Thereupon the swinging frame is allowed to fly back to initial position. The next step is to remove the filler, which is done by lifting it up, and shaking it a little the while, and thereupon the eggs have become transferred to the rack. This rack is now moved forward toward the dipping station on the rest surfaces 45, and as soon as one aggregation of eggs has been transferred to a rack the operation is repeated with the next, and so on. The man at station X, Fig. 1, is engaged simply in transferring eggs in fillers from the shipping box closely adjacent to him to one of the racks and freeing the racks from the filler. According to the operation thus described this is accomplished in an exceedingly rapid and easy way.

At the dipping tank 31 the rack containing the eggs is lowered into the hot oil for a few seconds. An attendant at that station slides the rack upon the reciprocating platform of Fig. 20, and, when the platform again rises, the rack is passed along toward the delivery end.

At 80, Fig. 1, means are provided for examining the egg treated. A plurality of lamps 81 are positioned below the eggs passing along in the respective racks. An attendant at this station, with a practiced eye, can readily detect an egg of inferior quality, which is then and there removed from the rack and a good one supplied. It is an ordinary candling operation, but is provided at a convenient place and as part of a continuous operation of removing eggs from a shipping crate, transferring them to racks, treating them, candling them, transferring them back to a filler, and reinserting them in a shipping box. The unit 80 is contained in a frame which may be moved along in the main channel to suit the operator's convenience. It slides suspended on the lower legs of the channels 45. (See Fig. 3.)

Figure 5:
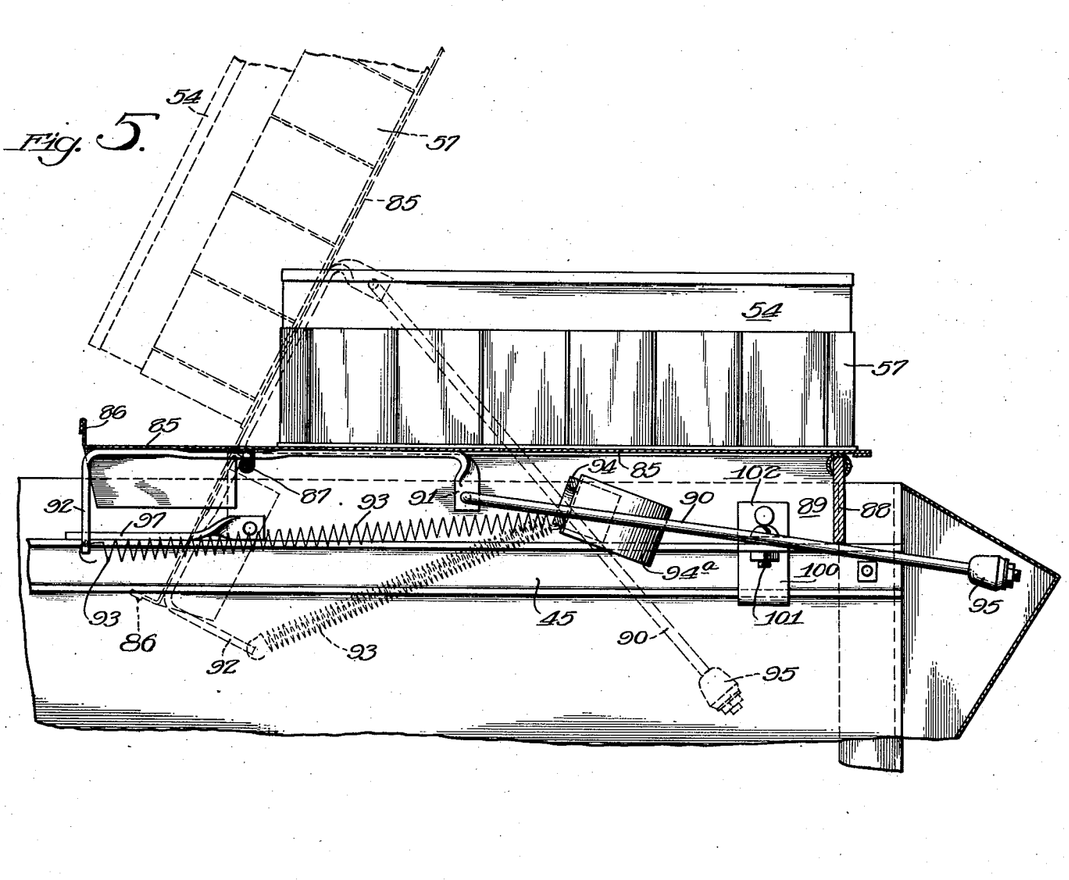
Fig. 5 is an enlarged fragmentary and sectional view of parts shown in Fig. 3, in changed position.
Figure 6:
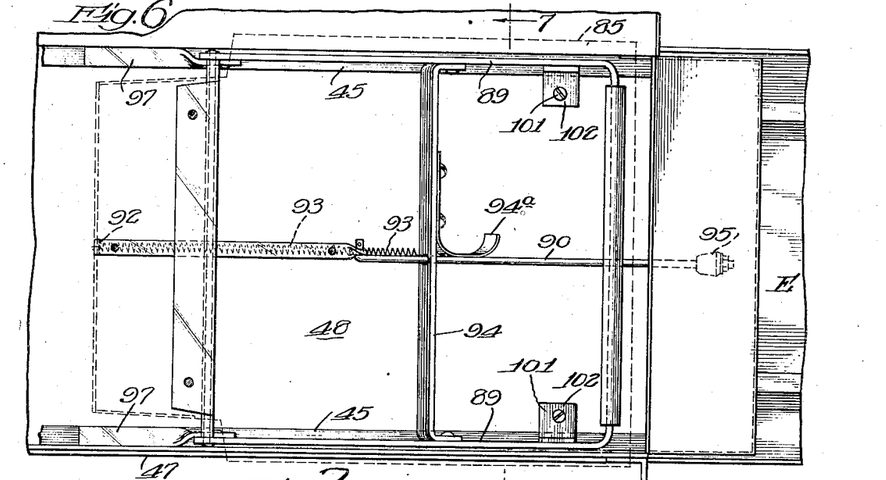
Fig. 6 is a fragmentary top view of parts shown in Fig. 5.

The eggs in the racks next reach the delivery end of the machine. Fig. 3 shows a fragment of a rack 54 with eggs e therein. It is desired to put a filler 57 back upon the eggs before they are crated. Fig. 3 shows a filler 57 applied to the eggs in a rack 54. It is desired also to remove the rack. For this purpose means are provided for turning the unit over much after the manner already described for the inverter device 62. The inverting unit at the delivery end comprises a platform 85 (Figs. 3 and 5) having a stop 86 to insure the unit against slipping off. This platform 85 is pivoted at 87 upon a frame having an end wall 88 and side walls 89, these side walls resting on the channel irons 45. A rod 90 is secured to the platform 85, and below it, as upon the bracket 91 secured to the under surface of the plate 85, this bracket at 92 extending at right angles to the plate 85 to serve as a lever arm for the spring 93 secured to a support 94 extending between the side walls 89 of the carrying frame. On the rod 90 is a buffer 95 of rubber, and the rod 90 passes freely through an elongated hole in the fixed support 94. The spring 93 tends to draw the swinging plate 85 into the relative position shown by Fig. 3, when it is ready to receive an egg unit. When in that position the operator simply turns up against the plate 85 the unit positioned as shown by full lines in Fig. 3, and, while holding it with the left hand, swings the unit and plate over into horizontal position, or into the full line position of the parts shown by Fig. 5. The weight of the eggs and of the rack and filler holds the plate 85 in that horizontal position against the tension of the spring 93.

The first thing the operator then does is to remove the metal rack 54 and drop it into the chute E as shown in Fig. 3, giving it a push downward or to the left to advance the whole line of racks 54 as already described. Thereupon he gathers up the eggs in the filler by a sort of bending and twisting action upon the filler which holds the eggs therein, and lifts the same bodily away from the plate 85 and into a storage box nearby. The plate 85 then swings back into its position of Fig. 3 to receive another unit. Attention is called to the stop 97 of Figs. 3 and 4 carried by the frame of the swinging member. This stop limits the advancing movement of the rack 54 so that when it is swung over into engagement with the plate 85 it will meet that plate face to face as shown by the dotted lines in Fig. 3.

When the plate 85 is swung to the left by the spring 93 the buffer 95 (see Fig. 8) engages the leaf spring 94a which acts as a brake upon the swinging movement and then as a clamp upon the buffer so that the plate is effectively stopped and held so as to avoid an objectionable rebound.

Fig. 9 shows how the various swinging device frames slidable on the channel irons 45 may be locked in any given position. There is a clamp 100 drawn against the channel iron by the bolt 101 passing through the bracket 102 riveted upon the side wall of the frame. It is sufficient to point out that each of the inverting devices has such clamping connections. Fig. 16 shows the bracket 100.

Turning to Figs. 1 and 2 it will be noted that at the delivery end there is a frame F adapted to hold a packing box 103. Fig. 2 shows that this box 103 sets at a convenient angle closely adjacent to where the operator finally removes the racks and deposits them in the chute E or the extension E' thereof.

From the foregoing it will be clear that means have thus been provided for performing in an exceedingly simple; easy and expeditious way a succession of operations consisting of the removal of fillers containing eggs from a shipping box, transferring the eggs to a rack, treating the eggs, candling them, re-transferring the eggs from the rack to a filler and then placing the eggs back into a shipping crate or box, all as a succession of operations in and at the same device. The expense connected with the handling of the commodity is highly important and the present improvements make for an important saving in that regard. It will be observed that the eggs are handled really but once, although by a plurality of operators. In other words in a brief space of time any given filler containing eggs has been removed from one shipping box, treated and put back in another box for shipment, all as a continuous operation.

I contemplate as being included in these improvements all such changes, variations and departures from what is thus specifically illustrated and described as fall within the scope of the appended claims.

I claim:

1. In an egg-treating machine having means proper for treating the eggs and means for conducting eggs in racks to said means proper from a loading station and away from said means proper to an unloading station, the combination therewith of guide means including a section thereof extending slantingly downward from a place closely adjacent to the unloading station for returning the racks with a sliding motion to the vicinity of the loading station.

2. The combination of claim 1 hereof in which said guide means include a section thereof slanting upward to approximately the elevation of and closely adjacent to the loading station.

3. The combination of claim 1 hereof in which said guide means include a substantially horizontal section thereof passing beneath said means proper.

4. The combination of claim 1 hereof in which there is a discharge receptacle for racks at the discharge end of said guide means arranged to receive racks passing out of the trough-like means.

5. The combination of claim 1 hereof in which there is an open-top receptacle having its bottom slanting upwardly and away from the discharge end of said trough-like means and arranged to receive racks dropping therein out of the trough-like means, the arrangement further providing that the racks are in upstanding position and side by side in the receptacle.

6. The combination with the return means for racks of the character described in an egg-treating machine, of an open-top receptacle having a bottom slanting upward and away from the discharge end of the return means, the receptacle being arranged in line with the discharge movement of the racks, the arrangement providing that racks will drop into the receptacle one after another from the return means and pack therein side by side in upstanding position.

7. In an egg-treating machine having means proper for treating the eggs, and means for conducting eggs in racks to said means proper, there being a loading station for eggs and a discharge station for empty racks adjacent to the free end of the conducting means, the combination therewith of means adjacent to said loading station for holding a shipping box containing eggs to be treated, and means adjacent to said discharge station for receiving such racks.

8. In an egg-treating machine having treating means proper and a relatively long frame extending in opposite directions therefrom with a loading station at one end of the frame and an unloading station at the opposite end thereof, the combination therewith of lateral extensions of said frame, one at each end thereof, for holding a packing crate immediately adjacent to the operator at said stations respectively, and means for conducting empty racks from the discharge station to the vicinity of the loading station, with means for holding a box to receive discharged racks thereat.

9. Means for transferring eggs from a rack of the character described to a filler of the character described comprising guide means for holding the rack for sliding movements, a swinging platform mounted in the path of such sliding movement to overlie a unit of such a rack containing eggs and a filler positioned upon the rack, the arrangement providing that the unit may be moved into contact with the swinging platform and then swung around whereby the rack is at the top of the filler and may be lifted away leaving the eggs contained only in the filler, with spring means for returning the platform to initial position.

10. Means for handling a unit comprising a rack, a filler, and eggs carried by the rack and filler, comprising a platform on which the unit may be placed, the platform being mounted to swing around to such an extent that the relationship of rack to filler becomes inverted, with spring means for returning the platform to initial position, and with means for maintaining the platform against material rebound when swung back to initial position by said spring means.

11. In an egg-treating machine a vertically-disposed bar having a platform at the bottom for holding a rack containing eggs, said bar being mounted in a pair of supports notched to receive the bar, with readily removable pins holding the bar in the notches respectively, means for reciprocating the bar and means including a readily releasable connection element for holding the bar readily removable upon the reciprocating means.

12. In an egg-treating machine, the combination of a platform adapted to hold a filler device containing eggs and a rack device so associated with the filler device that eggs may be transferred from one of said devices to the other thereof by inverting the two devices as a unit, said platform being mounted to swing whereby such unit thereon will be inverted, with spring means for returning said platform to initial position.

13. In an egg-treating machine, the combination of a platform adapted to hold a filler device containing eggs and a rack device so associated with the filler device that eggs may be transferred from one of said devices to the other thereof by inverting the two devices as a unit, said platform being mounted to swing whereby such unit thereon will be inverted, together with means for maintaining the platform against material rebound when swung back to initial position by said spring means.

14. In an egg-treating machine, the combination of a platform adapted to hold a filler device containing eggs and a rack device so associated with the filler device that eggs may be transferred from one of said devices to the other thereof by inverting the two devices as a unit, said platform being mounted to swing whereby such unit thereon will be inverted, a frame on which said platform is mounted, with means for holding said frame for sliding movement into various positions of adjustment, and means for holding the frame securely in a given position of such adjustment.

BURDETTE E. FORD.